United States Patent [19]

Desai et al.

[11] Patent Number: 4,496,463
[45] Date of Patent: Jan. 29, 1985

[54] DUPLEX STRAINER

[75] Inventors: Ashvin D. Desai; Alvin Bujack, both of Lumberton, N.C.

[73] Assignee: Mueller Steam Specialty, A Division of Core Industries, Inc., Lumberton, N.C.

[21] Appl. No.: 559,556

[22] Filed: Dec. 8, 1983

[51] Int. Cl.³ .............................................. B01D 35/12
[52] U.S. Cl. .................................... 210/341; 137/601; 137/867; 210/424
[58] Field of Search ................ 137/601, 867; 210/340, 210/341, 424; 251/231

[56] References Cited

U.S. PATENT DOCUMENTS 2,847,028 8/1958 Ross ...................................... 137/867
3,679,060 7/1972 Smith ............................... 210/340 X
4,080,990 3/1978 De Benedetti .................. 210/340 X Primary Examiner—Richard V. Fisher
Assistant Examiner—W. Gary Jones
Attorney, Agent, or Firm—Blum, Kaplan, Friedman, Silberman & Beran

[57] ABSTRACT

A duplex strainer having a housing with an inlet port and a outlet port. First and second strainer chambers each have first and second ports which are in separate fluid communication with the housing. An efficient scotch yoke design coverts rotation of a first shaft into reciprocal lateral displacement of first and second disk assemblies to permit either the first or second strainer chambers to be closed off to flow while the other of the first and second strainer chambers remain open to flow.

3 Claims, 5 Drawing Figures

DUPLEX STRAINER

BACKGROUND OF THE INVENTION

The present invention is directed to a duplex strainer and, in particular, to a duplex strainer having an improved flow diverter mechanism.

Where a fluid, steam or gas flow is required in a given application, it is often necessary that the flow from an upstream source be cleaned or strained before use downstream from the source thereof. Where such flow is strained in a cleaning or straining mechanism, it is very often desirable for the flow to remain continuous. However, where the flow is strained, a strainer filter or basket will eventually become dirty and clogged. Thus, it becomes necessary to clean such basket or filter. In order to effect such cleaning, the flow of liquid, steam or gas would have to be stopped which, as aforenoted, is often undesirable and may be practically impossible in certain applications.

Duplex strainers have been developed in order to permit continuous straining and cleaning of a flow. Duplex strainers generally include two strainer chambers and some type of mechanism for diverting the flow from one chamber to the other to permit cleaning or repairing of one chamber while the other is in use. This permits the flow through the duplex strainer to remain continuous.

The prior art methods of diverting the flow from one strainer chamber to another have proven less than completely satisfactory. For example, one prior art technique utilizes two hand valves for the inlet and outlet ports of the two strainer chambers. The hand wheels are joined together by a chain link so that their operation remains synchronized. Such strainers require a two shaft drive and a precision threaded drive shaft design. Moreover, the drive shafts are in the path of flow thereby creating a potential for premature wear and possible malfunction. Multiple turns of the hand wheels are required to effect flow diversion. Accordingly, it would be desirable to provide an improved duplex strainer which overcomes the disadvantages of prior art designs.

SUMMARY OF THE INVENTION

Generally speaking, in accordance with the present invention, a duplex strainer for straining a material such as liquid, steam or gas flowing through the strainer, is provided. The strainer includes a housing having an inlet port through which the material enters the housing under pressure for straining and an outlet port through which the strained material exits the housing. The housing includes a first strainer chamber having first and second ports in separate fluid communication with the housing and a second strainer chamber having third and fourth ports in separate fluid communication with the housing. The first port opposes the third port and the second port opposes the fourth port. A first disk assembly includes a first surface which faces the first port and a third surface which faces the third port. A second disk assembly includes a second surface which faces the second port and a fourth surface which faces the fourth port.

A first shaft is rotatably supported on the housing. A coupling mechanism selectively couples the first shaft to the first and second disk assemblies so that when the shaft is rotated in a first direction, the first and second faces of the first and second disk assemblies, respectively, are slid into engagement with the first and second ports of the first strainer chamber to close off the first chamber to flow while the third and fourth faces of the first and second disk assemblies, respectively, are slid away from the third and fourth ports of the second strainer chamber to open the second strainer chamber to flow. When the shaft is rotated in a second direction, the first and second faces are slid away from the first and second ports to open the first strainer chamber to flow while the third and fourth faces are slid into engagement with the third and fourth ports to close the second strainer chamber to flow.

Accordingly, it is an object of the present invention to provide an improved duplex strainer.

Another object of the present invention is to provide a duplex strainer having an improved mechanism for effecting flow diversion.

A further object of the present invention is to provide a duplex strainer which has a single shaft drive for effecting flow diversion.

A still further object of the present invention is to provide a duplex strainer which utilizes a scotch yoke design.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
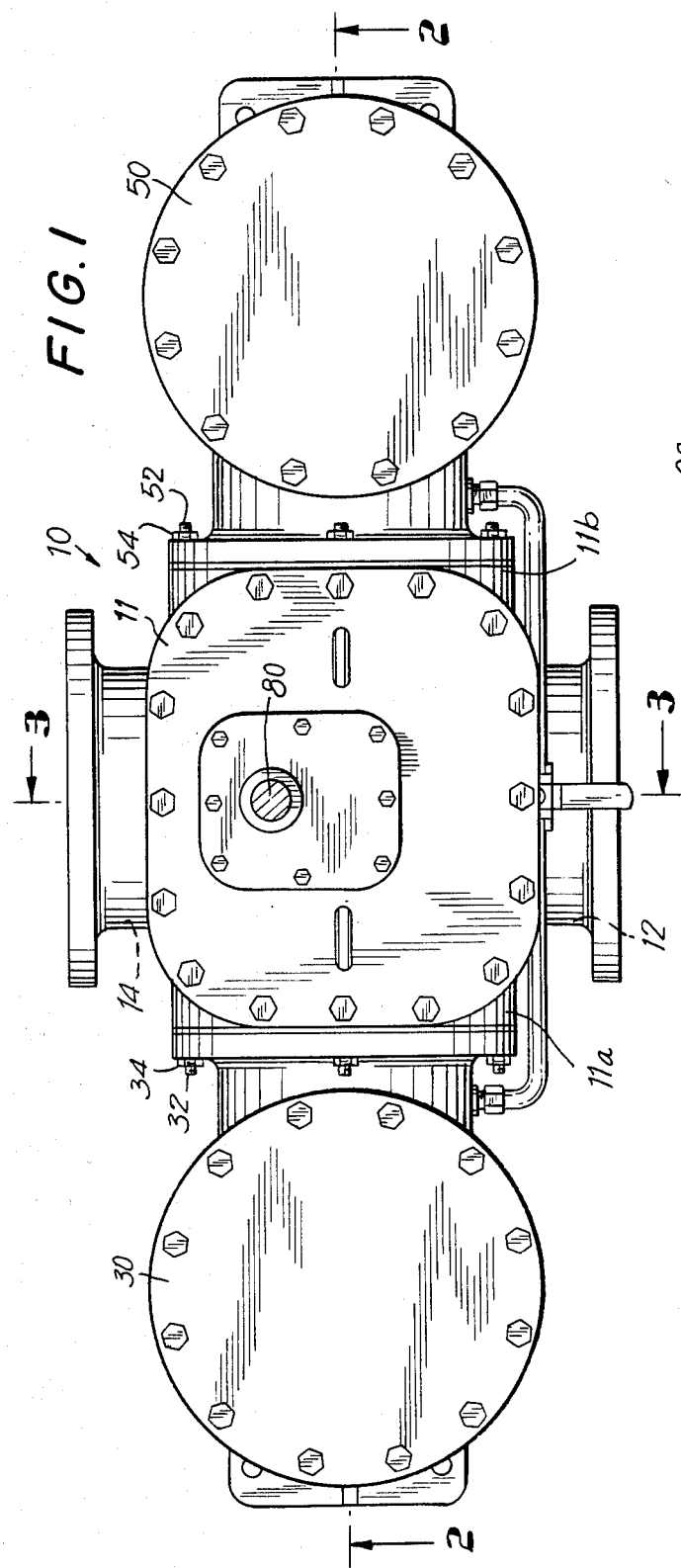
FIG. 1 is a top plan view of a duplex strainer constructed in accordance with a preferred embodiment of the present invention.
Figure 5:
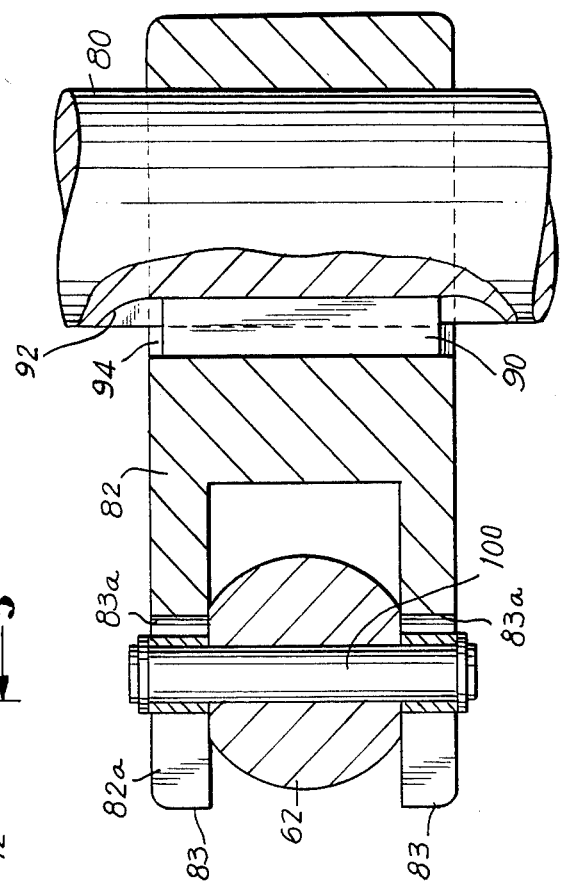
FIG. 5 is an enlarged sectional view showing the manner in which the main drive shaft is coupled to the disk assemblies of the duplex strainer of the present invention.

Reference is made to FIGS. 1 through 5 of the drawings which depict a duplex strainer, generally indicated at 10, constructed in accordance with a preferred embodiment of the present invention. Duplex strainer 10 includes a housing 11 having an inlet port 12 and outlet port 14. Housing 11 is preferably made from a cast iron material.

Housing 11 includes a first side 11a having a first inlet opening 16 and a second outlet opening 18. A second side 11b of housing 11 includes a third inlet opening 20 and a fourth outlet opening 22. Housing 11 also includes an internal wall configuration as depicted in order to properly direct the flow of material such as liquid, gas or steam entering inlet port 12 through the housing and out of outlet port 14 as will be described in detail below.

A first strainer chamber 30 is appropriately secured to first side 11a of housing 11 by, for example, studs 32 and nuts 34. First strainer chamber 30 includes a first port 36 in fluid communication with first opening 16 of housing 11, and a second port 38 in fluid communication with second opening 18 of housing 11. A removable strainer basket or filter 40 is provided in first strainer chamber 30 for straining and cleaning the material which flows therethrough.

A second strainer chamber 50 is appropriately secured to second side 11b of housing 11 by, for example, studs 52 and nuts 54. Strainer chamber 50 includes a third inlet port 56 in fluid communication with third opening 20 in housing 11, and a fourth outlet port 58 in fluid communication with fourth opening 22 in housing 11. Strainer chamber 50 also includes a filter basket (not shown) like filter basket 40 of first strainer chamber 30.

A first disk assembly 60 and a second disk assembly 70 are slideably supported for reciprocal lateral movement in housing 11. Disk assembly 60 includes a first disk shaft 62 having a first end 62a and a second end 62b. A first disk 64 is secured on first end 62a of disk shaft 62 by a bolt 63a. A second disk 66 is secured to second end 62b of disk shaft 62 by a bolt 63b. Disk 64 includes an outer surface 64a which faces first opening 16 in housing 11. First disk 64 is sufficiently sized so that it is capable of closing off opening 16 to flow when moved thereagainst. In this regard, outer surface 64a of first disk 64 may include a sealing O-ring 64b. Second disk 66 is similarly constructed as first disk 64 but faces third opening 20 and is adapted to seal opening 20 when moved thereagainst. Outer surface 66a of third disk 66 may also include an O-ring 66b to properly seal off third opening 20.

Second disk assembly 70 includes a second disk shaft 72 having a first end 72a on which is mounted a second disk 74 by means of a bolt 75a and a second end 72b on which is mounted a fourth disk 76 by means of a bolt 75b. Second disk 74 faces second opening 18 in housing 11 and fourth disk 76 faces opening 22 in housing 11 in the same manner that first disk 64 and third disk 66 face respective opening 16 and 20. In addition, disk 74 and 76 are constructed similarly to first disk 64 and third disk 66 and include outer surfaces 74a and 76a, respectively, with respective O-rings 74b and 76b.

A drive shaft 80 is rotatably supported on housing 11 and extends substantially perpendicular and adjacent to disk shafts 62 and 72. A first yoke 82 is coupled to drive shaft 80 adjacent disk shaft 62 so as to be rotatable with shaft 80. Similarly, a second yoke 84 is coupled to drive shaft 80 so as to be rotatable therewith adjacent drive shaft 72. A preferred method of coupling yokes 82 and 84 to drive shaft 80 is by means of a key 90 which is fitted in a slot 92 provided in drive shaft 80 and extends into an opening 94 provided in yoke 82.

Yokes 82 and 84 include first ends 82a and 84a, respectively, which are U-shaped in cross-section and are adapted to be fitted over flattened portions 63 and 73, respectively, of disk shafts 62 and 72, respectively. A roller pin 100 extends through first disk shaft 62 and is captured between fingers 83 of yoke 82 which define slots 83a. Similarly, a roller pin 101 is provided in second disk shaft 72 which is captured between fingers 85 of second yoke 84.

Accordingly, when drive shaft 80 is rotated, the rotation thereof will be transmitted through yokes 82 and 84 into linear sliding displacement of first and second disk shafts 62 and 72. Thus, when drive shaft 80 is rotated in a first direction, first disk 64 will close off opening 16 and first port 36 of first strainer chamber 30, and second disk 74 will close off second opening 18 and second port 38 of strainer chamber 30 to close strainer chamber 30 to flow. At the same time, third disk 66 will be moved away from third opening 20 and third port 56 of second strainer chamber 50, and fourth disk 76 will be moved away from fourth opening 22 and fourth port 58 of strainer chamber 50 in order to open strainer chamber 50 to flow. This configuration is best depicted in solid lines in FIG. 2.

Figure 2:
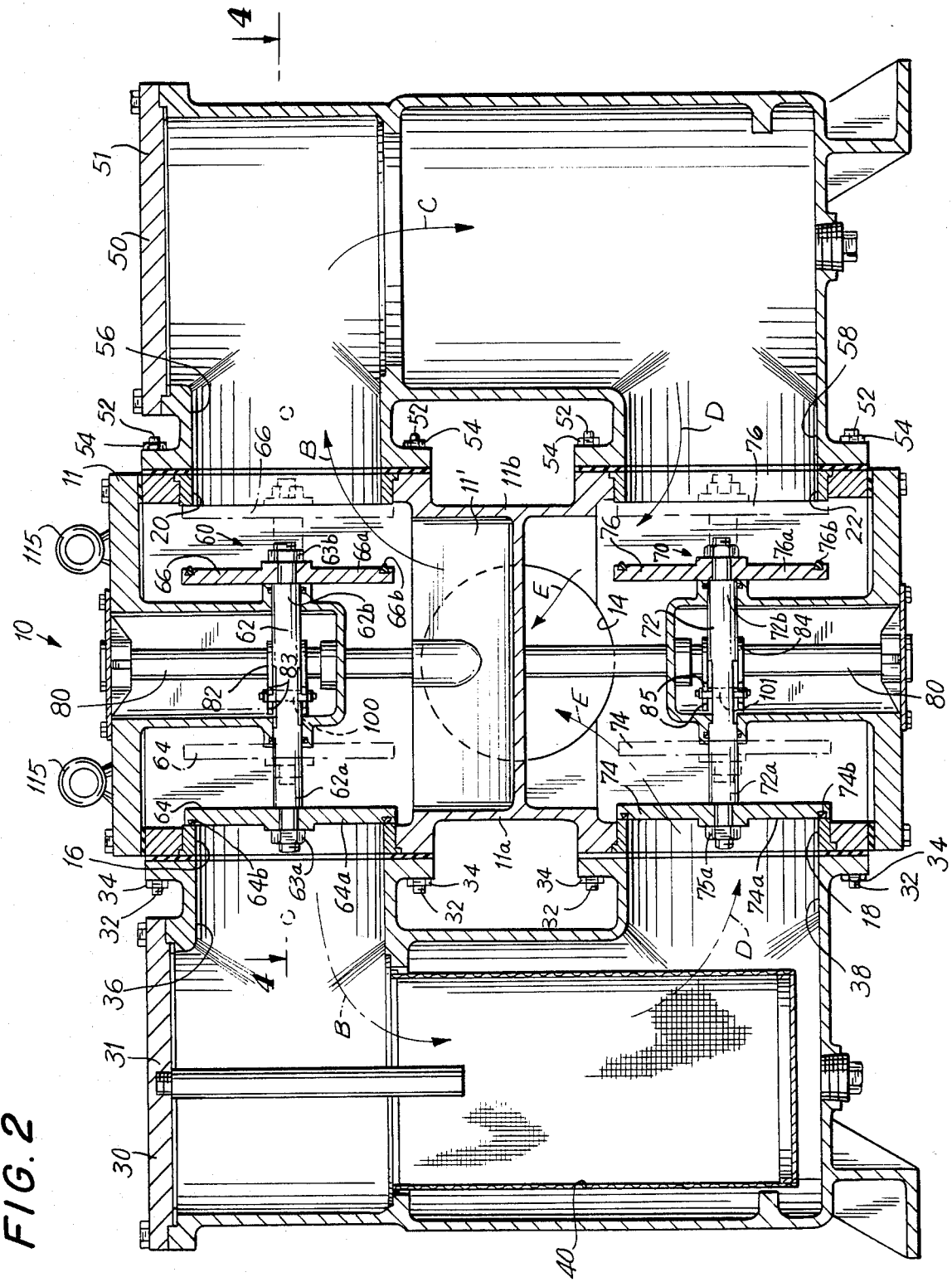
FIG. 2 is a sectional view taken along line 2—2 of FIG. 1.
Figure 3:
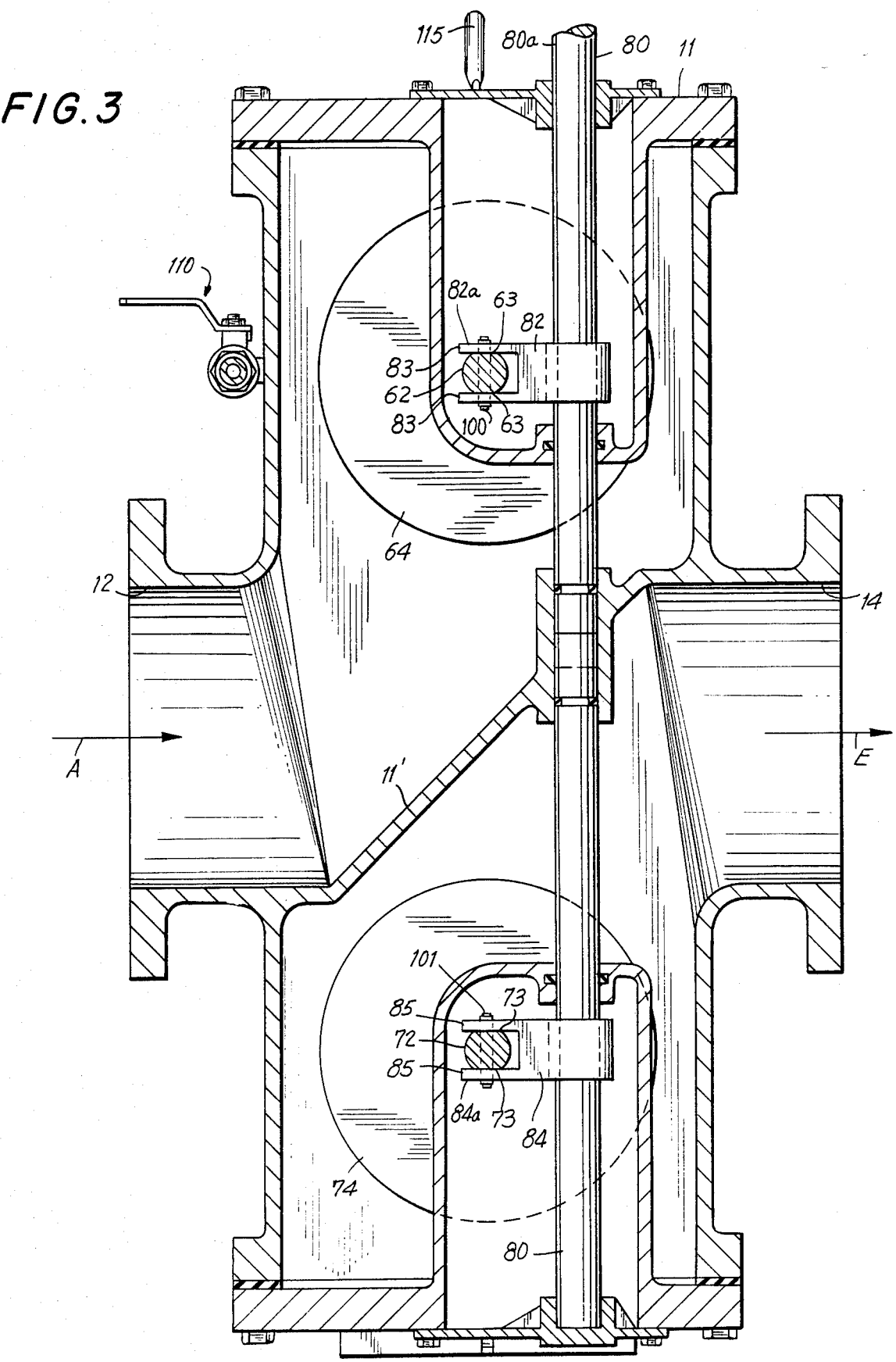
FIG. 3 is an enlarged sectional view taken along line 3—3 of FIG. 1.
Figure 4:
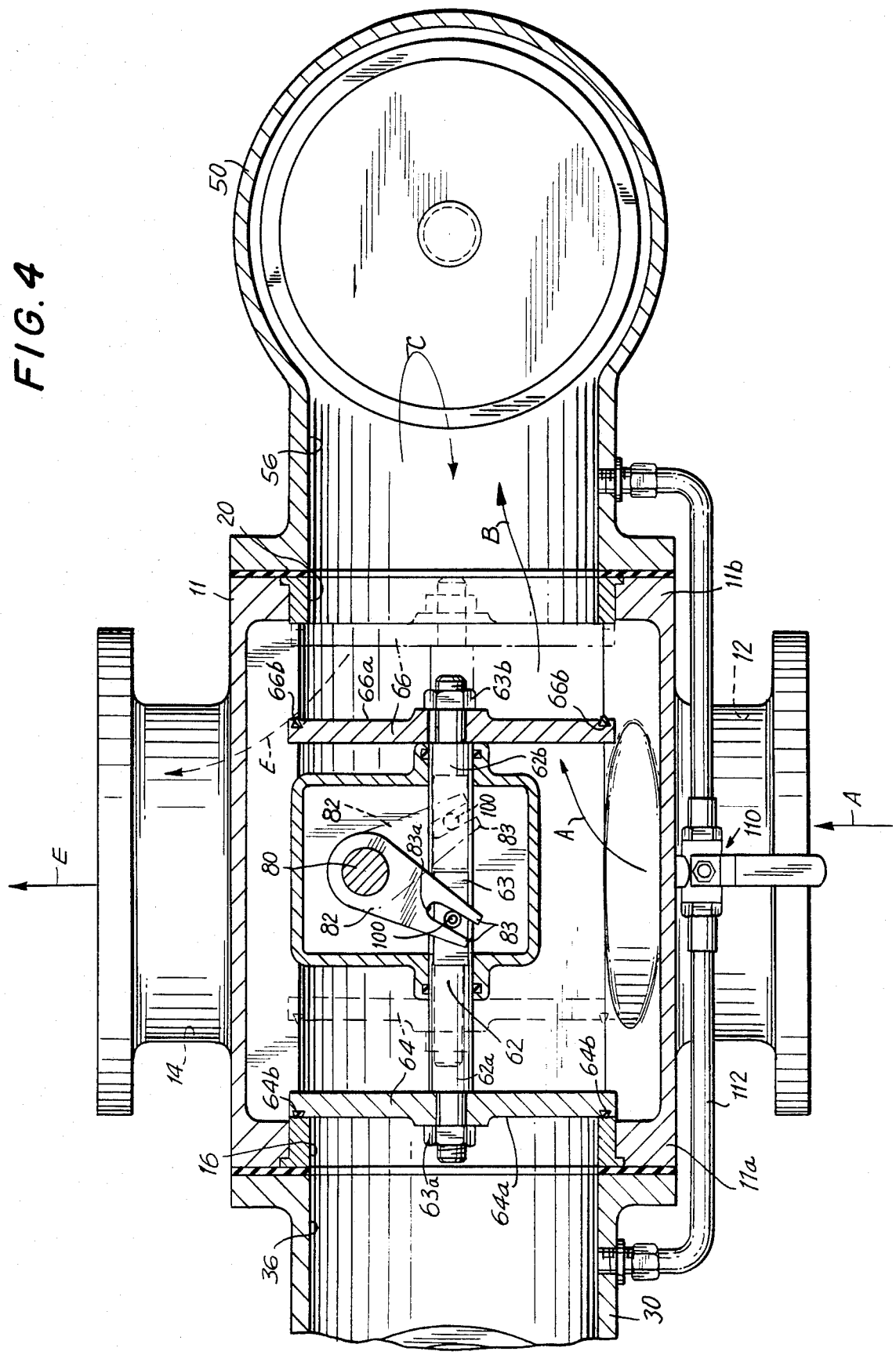
FIG. 4 is an enlarged sectional view taken along line 4—4 of FIG. 2.

When drive shaft 80 is rotated in a second direction, the position depicted in phanthom in FIG. 2 will be assumed by disk assemblies 60 and 70 thereby opening first strainer chamber 30 to flow and closing off second strainer chamber 50. It is noted that a handle (not shown) or other turning mechanism may be provided for portion 80a of drive shaft 80 which extends out of housing 11 in order to permit easy rotation thereof. Rotation of shaft 80 through an angle less than 90° is all that is required for diverting the flow from one strainer chamber to the other.

Due to the internal configuration of housing 11, substantial portions of drive shaft 80 and disk assemblies 60 and 70 will be isolated from the flow of material through the duplex strainer. This will prevent damage to the coupling portion of yokes 82 and 84 to drive shaft 80 and disk shafts 62 and 72 as well as preventing damage to drive shaft 80 itself.

Flow of material such as a liquid, steam or gas through duplex strainer 10 is as follows. The material is forced under pressure through inlet port 12 in the direction of arrow A and forced upward by means of the internal wall construction, such as incline wall 11', of housing 11. If second strainer chamber 50 is open to flow, the material will be forced through third inlet opening 20 and third port 56 of strainer chamber 50 in the direction of arrow B. The flow will then be forced through strainer chamber 50 in the direction of arrow C through a filter basket 40 of the type shown in first strainer chamber 30 which would be also be provided in second strainer chamber 50. Thereafter, the material would be forced in the direction of arrow D out of fourth port 58 and fourth outlet opening 22 and, thereafter, out of outlet port 14 for use downstream, in the direction arrow E.

If second strainer chamber 50 is closed off to flow as depicted in phantom in FIG. 2, the flow path of the material would be similar to that described above except the flow would be forced through first strainer chamber 30 in the direction of the arrows shown in phantom.

In order to equalize the pressure in first and second strainer chambers 30 and 50 before a diversion of flow is to be effected, an equalizing valve, generally indicated at 110, provided in a tubing 112 extending between first strainer chamber 30 and second strainer chamber 50 may be provided. Covers 31 of first strainer chamber 30 and 51 of second strainer chamber 50 are removable in order to permit cleaning of filter baskets 40 provided respectively therein. Finally, lifting eyes 115 may be provided on the exterior of housing 11 to permit appropriate attachment to a hook or chain to permit movement of duplex strainer 10.

The duplex strainer of the present invention by use of its single drive shaft which need only be rotated through a small angle less than 90° to accomplish flow diversion from one strainer chamber to the other, and the scotch yoke coupling of the main drive shaft to the two disk shafts of the respective disk assemblies, is a much improved design which overcomes the disadvantages noted above of the prior art duplex strainers. An efficient flow diversion is accomplished by a short rotation of the drive shaft and the relevant components are isolated from the flow of material to prevent damage and malfunction of the operative components.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A duplex strainer for straining a material supplied under pressure from upstream of the strainer and releasing the strained material for use downstream of the strainer comprising a housing having an inlet port through which the material enters the housing and an outlet port through which the strained material leaves the housing, a first strainer chamber having first and second ports in separate fluid communication with the housing, a second strainer chamber having a third port which opposes said first port and a fourth port which opposes said second port in separate fluid communication with said housing, a first disk assembly slidably supported on said housing intermediate said first and third ports having a first surface which faces said first port and a third surface which faces said third port, a second disk assembly slidably supported on said housing intermediate said second and fourth ports having a second surface which faces said second port and a fourth surface which faces said fourth port, a first shaft rotatably supported on said housing and extending proximate said first and second disk assemblies, and coupling means for coupling said first shaft to said first and second disk assemblies so that when said first shaft is rotated in a first direction, said first and second disk assemblies are slid towards said first strainer chamber to move said first and second surfaces into engagement with said first and second ports, respectively, to close said first strainer chamber to flow while said third and fourth surfaces are moved away from said third and fourth ports, respectively, to open said second strainer chamber to flow, and when said first shaft is rotated in a second direction, said first and second disk assemblies are slid towards said second strainer chamber to move said third and fourth surfaces into engagement with said third and fourth ports, respectively, to close said second strainer chamber to flow while said first and second surfaces are moved away from said first and second ports, respectively, to open said first strainer chamber to flow, said coupling means including a first yoke means coupled to said first shaft and said first disk assembly for converting the rotation of said first shaft into reciprocal linear movement of said first disk assembly and a second yoke means coupled to said first shaft and said second disk assembly for converting the rotation of said first shaft into reciprocal linear movement of said second disk assembly, said first yoke means including first and second ends, said first end of said first yoke means being coupled to said first shaft for rotation therewith, said second end of said first yoke means being coupled to said first disk assembly for reciprocal lateral displacement therewith, said second yoke means including first and second ends, said first end of said second yoke means being coupled to said first shaft for rotation therewith, said second end of said second yoke being coupled to said second disk assembly for reciprocal lateral displacement therewith, said first and second disk assemblies including first and second disk shafts, respectively, said first disk shaft extending intermediate and coupling said first surface to said third surface, said second disk shaft extending intermediate and coupling said second surface to said fourth surface, said second end of said first yoke means being U-shaped in cross-section and extending over said first disk shaft, said second end of said second yoke means being U-shaped in cross-section and extending over said second disk shaft, said first disk shaft including a first roller pin extending therethrough, said second end of said first yoke means extending over said first disk shaft to capture said first roller pin for rolling movement therewith, said second disk shaft including a second roller pin extending therethrough, said second end of said second yoke means extending over said second disk shaft to capture said second roller pin for rolling movement therewith.

2. The duplex strainer as claimed in claim 1, wherein said second ends of said first and second yoke means each include first and second slots, said first and second roller pins extending into said first and second slots of said second ends of said first and second yoke means, respectively, for rolling movement therewith.

3. The duplex strainer as claimed in claim 1, wherein said first shaft and said coupling means are substantially isolated from flow of material through said duplex strainer.

* * * * *